United States Patent [19]
Gutbrod et al.

[11] Patent Number: 5,133,595
[45] Date of Patent: Jul. 28, 1992

[54] LENGTH-ADJUSTABLE SPECTABLE TEMPLE

[75] Inventors: Heinz Gutbrod; Norbert Nowottny, both of Leonberg, Fed. Rep. of Germany

[73] Assignee: Marwitz & Hauser GmbH, Stuttgart, Fed. Rep. of Germany

[21] Appl. No.: 634,399

[22] Filed: Dec. 27, 1990

[30] Foreign Application Priority Data

Dec. 28, 1989 [DE] Fed. Rep. of Germany ....... 8915221

[51] Int. Cl.$^5$ .......................... G02C 7/10; G02C 5/20
[52] U.S. Cl. ..................................... 351/118; 351/111
[58] Field of Search ....................... 351/111, 118, 119; 2/448, 449, 450

[56] References Cited

U.S. PATENT DOCUMENTS

| 538,567 | 4/1895 | Wells | 351/118 |
|---|---|---|---|
| 3,318,654 | 5/1967 | Kreuzberger | 351/118 |
| 3,544,204 | 12/1970 | Bienenfeld | 351/118 |
| 4,946,268 | 8/1990 | Nowottny et al. | |

FOREIGN PATENT DOCUMENTS

| 1112925 | 3/1930 | Fed. Rep. of Germany . |
| 3047263 | 9/1983 | Fed. Rep. of Germany . |
| 1295024 | 11/1972 | United Kingdom . |

Primary Examiner—Rodney B. Bovernick
Attorney, Agent, or Firm—Walter Ottesen

[57] ABSTRACT

The length-adjustable spectacle temple includes at least two temple parts one of which is axially displaceable in a sleeve and is fixable in different positions. For this purpose, one of the temple parts is configured as a sleeve at least in one portion thereof. This sleeve has an axially extending slot for a latching slide adjustable axially in two positions. A spring element provided with a detent is disposed in the sleeve. A second temple part is so configured that it can be inserted in the first temple part. This second temple part has indexing recesses axially arranged on the insertable end and is configured to resiliently latch the detent. The latching slide completely covers the slot at least in the latched condition. The latching slide has a pressure body with which it latches the detent in a corresponding indexing recess in one of its two possible positions whereas the latching slide in its second position does not offer any resistance to movement of the two temple parts with respect to each other. A high degree of user satisfaction is provided with the spectacle temple since it makes possible an exchange of the insertable temple part and also permits a length displacement and a latching of the two temple parts to each other with relatively few components in a rapid and simple manner.

7 Claims, 1 Drawing Sheet

U.S. Patent
July 28, 1992
5,133,595
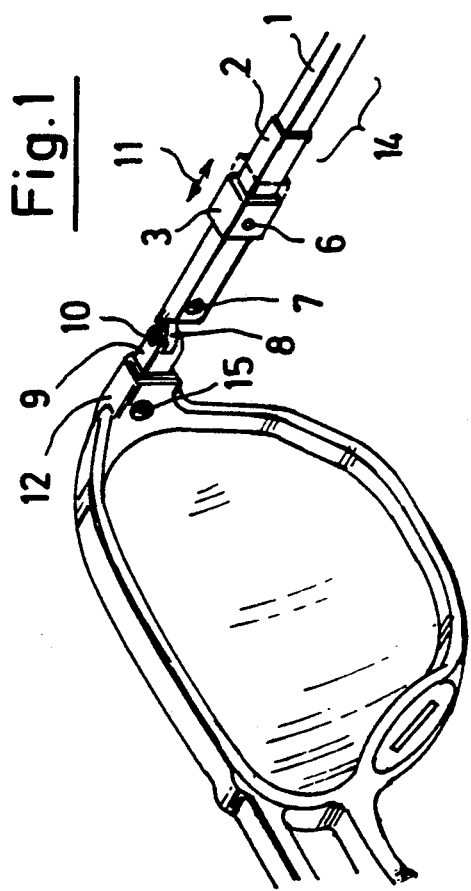
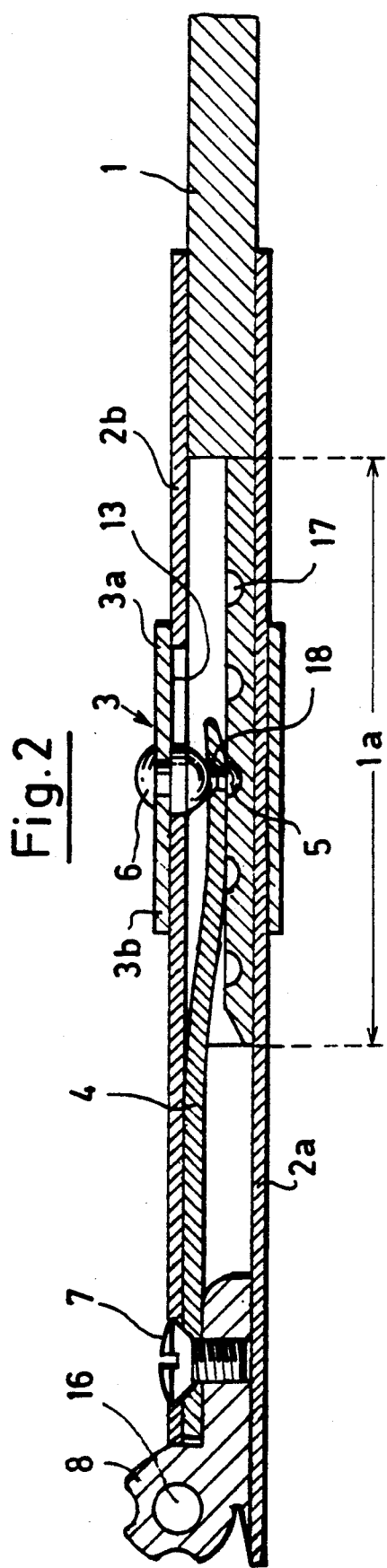

LENGTH-ADJUSTABLE SPECTABLE TEMPLE

FIELD OF THE INVENTION

The invention relates to a spectacle temple adjustable in length and includes at least two temple parts one of which is axially displaceable in a sleeve and can be fixed in different positions.

BACKGROUND OF THE INVENTION

Spectacle temples which are adjustable in length have been known for some time. Accordingly, German Pat. No. 30 47 263 discloses a length-adjustable spectacle temple wherein an out-lying spring element is attached in a clamping manner in the region of the pivot disc. This spring element closes to a large extent a longitudinally-extending cutout of a first sleeve-shaped temple part. A second temple part is inserted into this first temple part and has a rectangularly-shaped cross section. Several point-shaped projections of the spring element face toward the interior of the sleeve-shaped temple part and at the same time latch into several indexing recesses of the rectangularly-shaped spectacle part. The following are disadvantages of this spectacle temple: no releasable latching is possible; dirt collects in the region of the longitudinal gap between the spring element and the sleeve-shaped spectacle part; and, the danger is present that hair becomes caught between the spring element and the inserted spectacle part.

A spectacle temple of adjustable length is known from German Pat. No. 21 10 225 wherein indexing openings are provided in the sleeve-shaped spectacle part. The resiliently journalled element of the spectacle part to be inserted engages in these openings. Here too, no latching is possible and dirt collects in the course of time.

Latching is provided in the spectacle temple disclosed in published German utility registration 11 12 925 and U.S. Pat. No. 4,946,268 wherein the latching element is configured as an insert element and therefore must be removed from the spectacle temple.

SUMMARY OF THE INVENTION

It is an object of the invention to provide a spectacle temple which is adjustable in length and which can be exchanged and is latchable. It is a further object of the invention to provide a spectacle temple in which hair does not become caught and also wherein no dirt collects in the course of time.

The length-adjustable spectacle temple according to the invention is for a spectacle frame. The spectacle temple includes: first and second temple parts arranged along a common axis; the first temple part having a portion thereof configured as a sleeve having a slot extending substantially parallel to the axis; the second temple part having an end portion insertable into the sleeve so as to permit the second temple part to be displaceable relative to the first temple part; a latching arrangement for latching the first and second temple parts in a preselectable position relative to each other to adjust the spectacle temple to a predetermined length, the latching means including: indexing means formed on the end portion of the second temple part; a resilient element having a detent thereon and being mounted in the first temple part so as to place the detent adjacent the indexing means; a latching slide slidably mounted on the first temple part so as to cover the slot and be displaceable between first and second positions for engaging and releasing the indexing means, respectively; and, the latching slide having a pressure member extending through the slot for coacting with the resilient element and the detent when the slide is in the first position to press the detent into the indexing means to selectively fix the position of the second temple part with respect to the first temple part thereby adjusting the spectacle temple to the predetermined length.

The spectacle temple of the invention is distinguished by its high user acceptance. Its freedom of movement is limited to an axial movement by the sleeve-shaped form of the latching slide. Even this axial movement is limited by the pressure body mounted on the latching slide so that the latching slide can never become lost. The latching slide is adequately long so that the slot in the latching position is covered and so that it can furthermore be easily handled. The length and the material of the spring element determine the spring action with which the detent is pressed into an indexing recess on the spectacle part to be pushed on. This force does not have to be very great since only the fixation should be noticeable when the spectacle part to be inserted is displaced. The reliable positioning against an unwanted displacement then is achieved with the latching slide. In this way, an easy displacement is coupled with a reliable fixation during use. When used, the spring element is in its relaxed base position and for this reason a trouble-free long service life is assured. The condition that the spectacle temple is assembled from only a few parts which are easily disassembled and assembled also contributes to trouble-free use. With the closed construction, for which there are no visible open holes or slots, there is no danger of dirt accumulation or a clamping of the hair. This construction furthermore permits a simple rapid and easy exchange of different ear temples of different design which must be the same only in the area of latching.

BRIEF DESCRIPTION OF THE DRAWINGS

The invention will now be described with reference to the drawings wherein:

FIG. 1 is a partial view of a spectacle frame having a length-adjustable spectacle temple according to the invention mounted thereon; and, FIG. 2 is a detailed view of a section taken through the spectacle temple in the region essential for length adjustment.

DESCRIPTION OF THE PREFERRED EMBODIMENTS OF THE INVENTION

A spectacle temple 14 according to the invention is shown in FIG. 1. The spectacle temple 14 is adjustable in length and mounted in a spectacle frame 12. The lens frames and the nose bridge of the spectacle frame 12 are made, for example, of plastic. The temple region of each lens frame is provided with a thickening defining an opening into which a metal hinge block 9 is seated with its rearward metal extension having a quadratic cross section. The hinge block 9 is releasably attached with a screw 15. The hinge disc 8 of the spectacle frame 14 engages in the two outer hinge legs of the hinge block 9 and is held there with a screw 10 which extends through an inner opening 16 formed in the hinge disc.

The spectacle temple 14 is preferably made of metal and comprises essentially two parts (1, 2). A first temple part 2 is configured as a metal sleeve (guide tube) having a free opening into which a second temple part 1 is slidably introduced. The free opening of the metal sleeve of the first temple part 2 preferably has a rectangular form and is only slightly larger than the second temple part 1 having a rectangular cross section. The first temple part 2 is attached via a hinge disc 8 to the hinge block 9 of the spectacle frame 12 at its end lying opposite the free opening thereof.

A sleeve-shaped latching slide 3 is mounted about the sleeve-shaped first temple part 2 and can be displaced along the temple axis through a displacement 11. The latching slide 3 has a pressure body 6 visible from the outside which fixes the two temple parts (1, 2) at the interior of the sleeve-shaped first temple part 2. The operation of the longitudinal adjustment will be explained below with reference to FIG. 2.

FIG. 2 shows the forward portion of the spectacle temple 14 in section. The spring element 4 projects into the metal sleeve-shaped first temple part 2. The spring element 4 is tightly fastened to the joint disc 8 and to the temple part 2 via a screw 7. A detent 5 is disposed in the extended region of the spring element 4. The spring element 4 is configured so that it extends slightly downward and is rounded at its end. The end of the spring element 4 is inclined slightly upward so that the spring element does not impede the insertion of the second temple part 1 and provides a latching when indexed. If the latch slider 3 is in its right-hand released position, then the extension 1a of the temple part 1 to be inserted can easily be pushed between the spring element 4 and an end 2a of the sleeve-shaped temple part 2. The temple part 1 is thinner than the temple part 2 and has a chamfered end. A plurality of half-circular shaped indexing openings 17 are provided in the extension 1a of the temple part 1 to be inserted. The form of the indexing recesses 17 corresponds to the form of the surface of the detent 5 in the spring element 4 at the hinge disk 8.

As mentioned, the leaf spring element 4 is bent slightly downward and in this way makes possible the detent engagement into the indexing openings 17 of the extension 1a of the second temple part 1 which is to be inserted. This condition notwithstanding, the extension 1a of the temple part 1 to be inserted can be easily moved between the spring element 4 and the outer side 2a of the sleeve-shaped temple part 2 because the unidirectional clamping of the spring element 4 by means of the screw 7 is as far distant as possible from the detent 5 attached to the spring element 4 which leads to a very slight spring temper.

The side 2b of the sleeve-shaped temple part 2 faces toward the face of the wearer and has a slot-like opening 13. The pressure body 6 attached to the latching slide 3 engages through this slot 13 into the interior of the sleeve-shaped temple part 2. The pressure body 6 is disposed in a hole of the latching slide 3 in which hole the pressure body 6 is tapered. The pressure body 6 has a larger rounded shape outside of the hole in the latching slide 3 so that the pressure body 6 is securely anchored in the latching slide 3. The outer and inner surfaces of the pressure body 6 are configured so as to be spherical. In the latched condition shown in FIG. 2, the pressure body 6 detents into an opening 18 of the spring element 4 and latches the detent 5 in the corresponding indexing recess 17 and thereby latches the temple parts (1, 2) with respect to each other.

If the length of the spectacle temple 14 is to be changed, then the latching slide 3 is pressed into the position facing away from the hinge disc 8. In this way, the latching pressure body 6 passes over the upwardly inclined end of the spring element 4 into a position in which the pressure body does not impede the easy movability of the spring element 4. The lateral faces (3a, 3b) of the latching slide 3 about the pressure body 6 are so great that the slot 13 in the sleeve-shaped temple part 2 is not visible in any position of the latching slide 3.

The part of the sleeve-shaped temple part 2 behind the slot 13 up to the insert opening for the temple part 1 to be inserted is so long that even in the outermost indexing position, the extension 1a of the temple part 1 to be inserted is not visible.

The temple part 1 to be inserted can easily be exchanged for another insertable temple part. For this purpose, the insertable temple part 1 is simply pulled out completely from the sleeve-shaped temple part 2 and the other insertable temple part is introduced into the sleeve-shaped temple part 2. This exchange can take place very rapidly and without tools whereby a spectacle equipped with this length-adjustable spectacle temple can be easily provided with other spectacle temples. Only in the region of the insertable temple part 1 must this temple part be configured the same so that the temple parts 1 with different design can be quickly, rapidly and reliably attached to the spectacles. If the length adjustment of the insertable temple part is eliminated, then the selection of the design for the insertable temple in its visible region is completely free.

The hinge disc 8 can be attached to the sleeve-shaped temple part 2 as illustrated. The temple part 2 can also be attached to the end of the insertable temple part with the free end then being inserted into the sleeve-shaped temple part which extends from the ear of the wearer.

It is understood that the foregoing description is that of the preferred embodiments of the invention and that various changes and modifications may be made thereto without departing from the spirit and scope of the invention as defined in the appended claims.

What is claimed is:

1. A length-adjustable spectacle temple for a spectacle frame, the spectacle temple comprising:
   first and second temple parts arranged along a common axis;
   said first temple part having a portion thereof configured as a sleeve having a slot extending substantially parallel to said axis;
   said second temple part having an end portion insertable into said sleeve so as to permit said second temple part to be displaceable relative to said first temple part;
   a latching arrangement for latching said first and second temple parts in a preselectable position relative to each other to adjust the spectacle temple to a predetermined length, said latching means including:
   indexing means formed on said end portion of said second temple part;
   a resilient element having a detent thereon and being mounted in said first temple part so as to place said detent adjacent said indexing means;
   said resilient element being disposed within said sleeve so as to be hidden from view;
   a latching slide slidably mounted on said first temple part so as to be displaceable between first and second positions for holding and releasing said indexing means, respectively;
   said slide having a length measured in the direction of said axis to ensure that said slot is completely covered and hidden from view at least when said slide is in said first position; and, said latching slide having a pressure member extending through said slot for coacting with said resilient element and said detent when said slide is in said first position to press said detent into said indexing means to selectively fix the position of said second temple part with respect to said first temple part thereby adjusting the spectacle temple to said length.

2. The length-adjustable spectacle temple of claim 1, the spectacle frame having a hinge for hinge connecting the first temple part thereto; and, said resilient element being connected to said first temple part in the vicinity of said hinge.

3. The length-adjustable spectacle temple of claim 1, said indexing means being a plurality of recesses formed in said end portion of said second temple part so as to be disposed one next to the other in the direction of said axis.

4. The length-adjustable spectacle temple of claim 3, each of said recesses being semicircular when viewed in section; and, said pressure member having a spherical configuration for facilitating the engagement thereof with said recesses.

5. The length-adjustable spectacle temple of claim 1, said second part having a remaining portion extending from said end portion in the direction of said axis; said end portion having a free end facing toward said resilient element and a cross section less than the cross section of said remaining portion; and, said free end having a wedge-shaped configuration for coacting with said resilient element when said second temple part is inserted into said first temple part.

6. The length-adjustable spectacle temple of claim 1, said slider having a surface in sliding contact with said first temple part and said surface having a length sufficient to permit said surface to cover said slot in both of said positions of said latching device.

7. The length-adjustable spectacle temple of claim 2, said hinge including a disc and said resilient element being attached to said disc.

* * * * *